United States Patent
Horton

(10) Patent No.: US 10,913,029 B2
(45) Date of Patent: Feb. 9, 2021

(54) METHOD AND APPARATUS FOR REMOVING H$_2$S SCAVENGERS FROM A FLUID STREAM

(71) Applicant: Canadian Energy Services L.P., Calgary (CA)

(72) Inventor: David Horton, Calgary (CA)

(73) Assignee: Canadian Energy Services L.P., Calgary (CA)

(*) Notice: Subject to any disclaimer, the term of this patent is extended or adjusted under 35 U.S.C. 154(b) by 0 days.

(21) Appl. No.: 16/791,080

(22) Filed: Feb. 14, 2020

(65) Prior Publication Data

US 2020/0261844 A1    Aug. 20, 2020

Related U.S. Application Data

(60) Provisional application No. 62/805,719, filed on Feb. 14, 2019, provisional application No. 62/857,653, filed on Jun. 5, 2019.

(51) Int. Cl.
*B01D 53/52* (2006.01)
*B01D 53/75* (2006.01)

(52) U.S. Cl.
CPC ............. *B01D 53/52* (2013.01); *B01D 53/75* (2013.01); *B01D 2257/304* (2013.01); *B01D 2259/124* (2013.01)

(58) Field of Classification Search
USPC ........................................................ 423/220
See application file for complete search history.

(56) References Cited

U.S. PATENT DOCUMENTS

| 4,472,246 A | * | 9/1984 | Stamerjohn | B01D 3/36 |
| | | | | 203/37 |
| 2013/0004393 A1 | * | 1/2013 | Menendez | B01D 53/79 |
| | | | | 423/228 |

\* cited by examiner

*Primary Examiner* — Anita Nassiri-Motlagh
(74) *Attorney, Agent, or Firm* — Ted Whitlock; Santucci Priore PL

(57) ABSTRACT

A method, scrubbing solution and apparatus for removing a H$_2$S scavenger, for example dithiazine, from a gas stream uses an acidic solution to convert the H$_2$S scavenger to a salt. The acidic solution may be a phosphoric acid solution.

22 Claims, 1 Drawing Sheet

METHOD AND APPARATUS FOR REMOVING H₂S SCAVENGERS FROM A FLUID STREAM

FIELD OF INVENTION

The invention relates to removal of hydrogen sulfide ($H_2S$) scavengers from a fluid stream, such as for quantification of the $H_2S$ scavengers or for mitigating pipeline deposits.

BACKGROUND OF THE INVENTION

Removal of $H_2S$ from fluid streams is often achieved by passing the fluid stream through a solution containing "triazine". The triazine is the reaction of 3 moles of ethanolamine with 3 moles of formaldehyde, so it is an N,N',N" tris-2-hydroxethyl hexahydrotriazine. When triazine is reacted with two moles of $H_2S$, a substance known as dithiazine ($C_3H_3NS_2$) is formed. This triazine process reaction substitutes two sulfur atoms and liberates two ethanolamine molecules in the triazine. The $H_2S$ scavenger is causing issues downstream of the triazine process where the $H_2S$ scavengers, such as dithiazine, are depositing in pipelines.

Analytical instruments are manufactured where an Amberlite™ (Rohm and Haas Co.) ion exchange resin, which is a divinylbenzene/styrene copolymer, is used on a slipstream of gas to scavenge dithiazine by adsorption thereon. After a period of time, the Amberlite resin is removed from the instrument, the absorbed dithiazine is stripped from the resin and the stripped dithiazine is quantified.

SUMMARY OF THE INVENTION

Methods, compositions and apparatus have been invented for removing an $H_2S$ scavenger from a fluid stream. The method may be for identifying or quantifying $H_2S$ scavenger in a fluid stream or for removal such as for mitigating $H_2S$ scavenger deposition in pipelines. The apparatus may be smaller such as an analytical instrument for identifying the presence of or concentration of an $H_2S$ scavenger in a fluid stream. Alternately, the apparatus may be on a scale for mass removal of $H_2S$ scavenger from a fluid stream, such as for mitigating $H_2S$ scavenger deposition in pipelines. Such an apparatus may sometimes be defined as a scrubber.

In accordance with a broad aspect of the present invention, there is provided a method of removing an $H_2S$ scavenger from a gas stream comprising: passing the gas stream through an acidic solution.

In accordance with another broad aspect of the present invention, there is provided an apparatus for removing an $H_2S$ scavenger from a gas stream comprising: a chamber containing an acidic solution; an inlet port for introducing the gas stream to the chamber to pass through the acidic solution and to produce a treated gas stream; and an outlet port for outlet of the treated gas stream from the chamber.

In accordance with another broad aspect of the present invention, there is provided a phosphoric acid solution buffered to pH 2-4 for scrubbing a $H_2S$ scavenger from a gas stream.

It is to be understood that other aspects of the present invention will become readily apparent to those skilled in the art from the following detailed description, wherein various embodiments of the invention are shown and described by way of illustration. As will be realized, the invention is capable for other and different embodiments and its several details are capable of modification in various other respects. Accordingly, the detailed description and examples therein are to be regarded as illustrative in nature and not as restrictive.

BRIEF DESCRIPTION OF THE DRAWINGS

To facilitate understanding, the following drawings are included.

DETAILED DESCRIPTION

Figure 1:
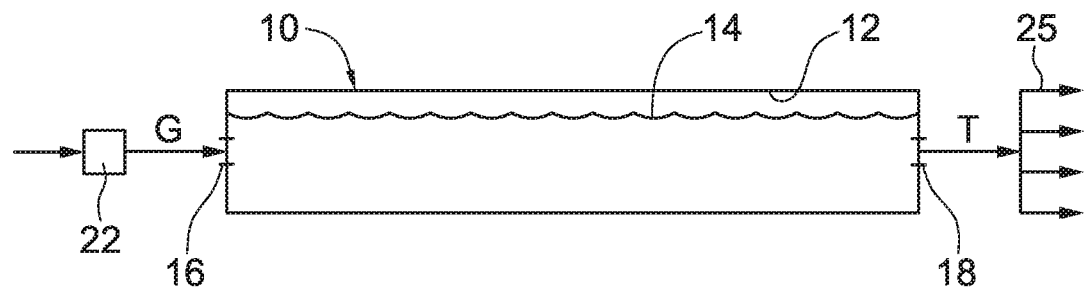
FIG. 1 is a schematic illustration of one apparatus according to the present invention.

The detailed description set forth below is intended as a description of the present invention and is not intended to represent the only embodiments contemplated by the inventor. The detailed description includes specific details for the purposes of providing a comprehensive understanding of the present invention. However, it will be apparent to those skilled in the art that the present invention may be practiced without these specific details.

A method has been invented to remove $H_2S$ scavengers, such as an amine-based scavenger including dithiazine, from a fluid stream, the method contacts the fluid stream with an acidic scrubber solution. The method may be for identification or quantification of the $H_2S$ scavenger in the fluid stream or to ameliorate the problem of $H_2S$ scavengers such as dithiazine depositing in a pipeline. The scrubber solution removes the $H_2S$ scavenger from the fluid stream.

To avoid any confusion, a solution includes the acid in a liquid. The solution will often be acid in water.

An acidic solution is useful to capture dithiazine from a gas stream. It is believed that the dithiazine is removed by the acid solution because when dithiazine comes into contact with an acid, the salt forms. The salt has a vapor pressure many orders less than the parent amine. Thus, the resulting salt has a very low vapor pressure and is captured in the scrubber solution. To explain, salts of organic bases are ionic in nature, unlike the parent organic base, which contains only covalent bonds. Ionic substances have, in general, much lower vapor pressures than the parent acids and bases and correspondingly higher boiling points.

A useful acid for the scrubber solution is one with an acid dissociation constant (pKa value) such that a substantial portion of the acid will react with the dithiazine base to form the salt. Buffered solutions also work well. In one embodiment, useful acids are those with a pKa value equal to or less than 7.5 or buffered solutions made from acids with a pKa value equal to or less than 7.5.

Particularly useful acids are those with low vapor pressures. This is to avoid downstream issues where an acid itself, in volatilized form, is carried through the gas transmissions pipeline system. For example, hydrochloric acid is useful to scrub the dithiazine from a gas stream, but hydrochloric acid has a higher vapor pressure and therefore is less desirable than some other acids with lower vapor pressure. In particular, the vapor pressure of aqueous hydrochloric acid at ambient temperature of 20° C. (68° F.) is about 600 psia. The use of such higher vapor pressure acids may liberate acid gas during the scrubbing process, and therefore the resulting process stream may need extra handling downstream of the scrubber. For example, the liberated acid gas may be need to be scrubbed out of the produced fluid flow downstream of this H$_2$S scavenger scrubbing process, for example in an acid scrubber, hence the desirability for a low vapor pressure acid.

One particularly useful scrubber is a solution of phosphoric acid, such as a phosphoric acid solution buffered to a pH of about 2 to 4. In one embodiment, for example, a scrubbing composition for removing dithiazine from a gas stream is a phosphoric acid solution buffered to a pH of about 3. Such a buffered phosphoric acid scrubbing solution provides adequate scrubbing, low corrosivity and has little to no vapor pressure arising from the acid.

Figure 2:
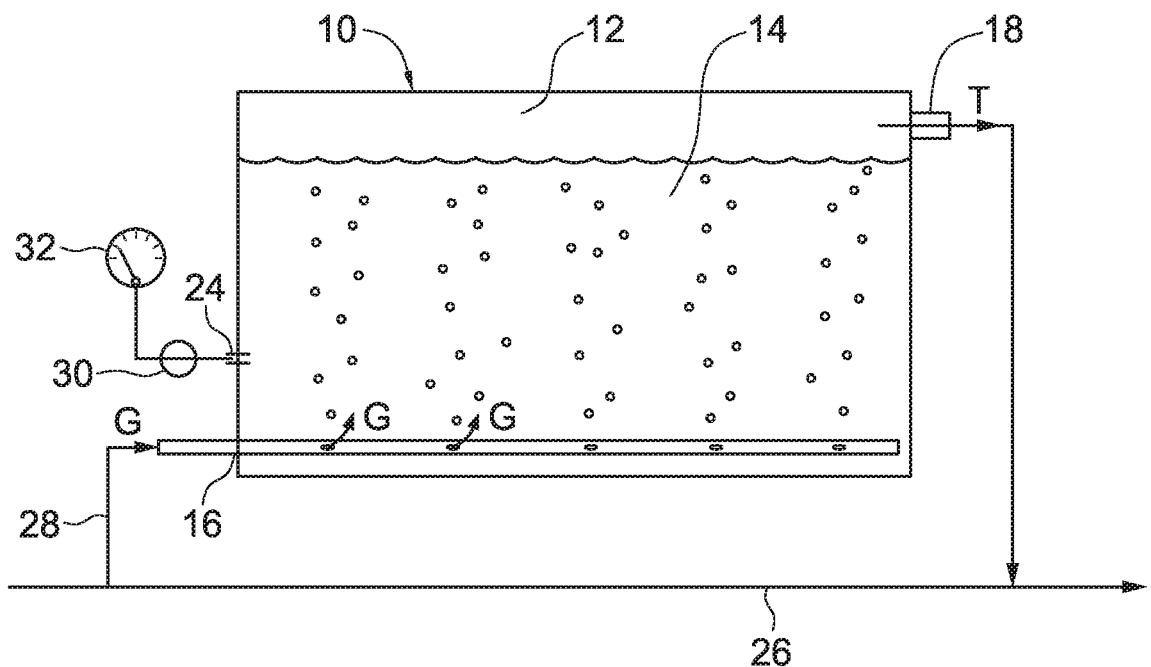
FIG. 2 is a schematic illustration of one apparatus according to the present invention.

The scrubbing solution may be used in an apparatus to strip the dithiazine from a gas stream. With reference to FIGS. 1 and 2, the apparatus 10 includes a chamber 12 for containing an acid solution 14; an inlet port 16 for introducing a gas stream, arrows G, to the chamber to pass through the acidic solution and to produce a treated gas stream, arrows T; and an outlet port 18 for outlet of the treated gas stream from the chamber.

The apparatus 10, such as that shown in FIG. 1, may be useful for treating a larger gas flow, such as one intended for pipeline transport. In such an embodiment, the gas flow G may be substantially the entire, continuous, flow from the pipeline after it passes through an H$_2$S scavenging apparatus 22, such as one containing a triazine scavenger.

In this embodiment, the apparatus is a larger scale structure so that it can scrub mass gas flows, such as those intended for pipeline conveyance. The apparatus operates to remove some or all of the dithiazine therein. The scrubber apparatus 10 is positioned after the triazine process and prior to the pipeline. For example, the scrubber apparatus may in inline in a gas handling system, positioned downstream of the triazine processor 22 and upstream of a distribution pipeline 25 such that the scrubber solution removes the H$_2$S scavenger from the gas stream after the H$_2$S scrubbing process and prior to further flow of the gas through the pipeline such as prior to introduction of the gas stream to a further pipeline.

In another embodiment, such as that shown in FIG. 2, the apparatus 10, may be an instrument for analyzing a gas flow. For example, in one embodiment, the scrubbing solution may be employed in an analytical instrument for identifying and quantifying the presence of dithiazine in a gas stream. Compared to an analytical instrument using a divinylbenzene/styrene copolymer resin (i.e. commonly referred to as Amberlite resin), the scrubber solution could be used in the place of the Amberlite ion exchange resin to strip the dithiazine. Such an analytical instrument can include a sampling port 24 providing access to the chamber, and thereby the solution 14. Such an apparatus, therefore, provides an advantage wherein aliquots of the liquid scavenger solution 14 can be taken over time without removing the scavenger and while the instrument remains in operation. Therefore, continuous monitoring or measurement of dithiazine concentrations could be realized.

Apparatus 10, when configured as an analytical instrument, is a device that can receive a slipstream of gas, for example, from a gas transmission line 26. The gas to be treated G, then, is received from a subconduit 28 from line 26. Subconduit 28 is connected at inlet port 16. Gas to be treated G is directed from inlet port 16 through the scrubbing solution in the chamber. The scrubbing solution captures the dithiazine before the treated gas exits through outlet port 18 and returns to line 26 or is otherwise redirected. The scrubbing solution can be analyzed to identify or quantify the dithiazine therein, for example, by analysis for the dithiazine salt. The instrument may operate with or include a manual or automatic sampling option, such as may include a sampling pump 30 and analyzer 32 (for example X-ray fluorescence (XRF), gas chromatography (GC), etc.), in communication with sampling port 24 through which the scrubbing solution is sampled. In one embodiment, while the instrument 10 remains in operation, the scrubbing solution is sampled manually or automatically. The scrubbing solution sample may be sent out for analysis or analyzed by a real time method. The instrument may be configured for auto-sampling of the scrubber solution through the sampling port and possibly auto-analysis of the obtained sample. The amount of dithiazine present in the scrubbing solution may be determined.

Example I

A gas stream containing dithiazine was bubbled through an aqueous solution of phosphoric acid buffered to pH 3. More than 99% of the dithiazine was removed from the gas stream.

The previous description of the disclosed embodiments is provided to enable any person skilled in the art to make or use the present invention. Various modifications to those embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are know or later come to be known to those of ordinary skill in the art are intended to be encompassed by the elements of the claims. Moreover, nothing disclosed herein is intended to be dedicated to the public regardless of whether such disclosure is explicitly recited in the claims. No claim element is to be construed under the provisions of 35 USC 112, sixth paragraph, unless the element is expressly recited using the phrase "means for" or "step for".

The invention claimed is:

1. A method of removing dithiazine from a gas stream comprising:
    passing the gas stream containing the dithiazine through an acidic solution, to thereby remove the dithiazine from the gas stream.

2. The method of claim 1 wherein passing converts the dithiazine to a salt.

3. The method of claim 1 further comprising prior to passing, receiving the gas stream from a scavenging apparatus containing triazine.

4. The method of claim 1 further comprising after passing the gas stream through the acidic solution, flowing the gas stream into a pipeline, the method of removing thereby mitigating deposition of the scavenger in the pipeline.

5. The method of claim 1 wherein passing the gas stream through the acidic solution modifies the acidic solution to a salt-containing acidic solution and further comprising obtaining a sample of the salt-containing acidic solution and analyzing the sample for an amount of a dithiazine salt in the salt-containing acidic solution to determine a concentration of the dithiazine in the gas stream.

6. The method of claim 5 wherein obtaining a sample occurs while the step of passing continues.

7. The method of claim 1 wherein the acidic solution includes an acid with a vapor pressure less than hydrochloric acid.

8. The method of claim 1 wherein the acidic solution is a phosphoric acid solution buffered to pH 2-4.

9. A method for removing an H2S scavenger reaction product from a gas stream, the method comprising:
    passing a gas stream from a scavenging apparatus containing triazine through an acidic solution.

10. The method of claim 9 wherein passing converts the H2S scavenger reaction product to a salt.

11. The method of claim 9 further comprising, after passing, directing the gas stream into a pipeline.

12. The method of claim 9 wherein the acidic solution includes an acid with a vapor pressure less than hydrochloric acid.

13. The method of claim 9 wherein the acidic solution is a phosphoric acid solution buffered to pH 2-4.

14. The method of claim 9 wherein passing generates a modified acidic solution, and the method further comprises:
    obtaining a sample of the modified acidic solution; and
    analyzing the sample for an amount of the H2S scavenger reaction product in the modified acidic solution to determine the amount of the H2S scavenger reaction product in the gas stream.

15. A method for determining a concentration of an H2S scavenger reaction product in a gas stream, the method comprising:
    passing the gas stream through an acidic solution to generate a modified acidic solution;
    obtaining a sample of the modified acidic solution; and
    analyzing the sample for an amount of the H2S scavenger reaction product in the modified acidic solution to determine the amount of the H2S scavenger reaction product in the gas stream.

16. The method of claim 15 wherein passing converts the H2S scavenger reaction product to a salt.

17. The method of claim 16 wherein the analyzing step analyses the sample for the salt of the H2S scavenger reaction product.

18. The method of claim 15 wherein passing occurs downstream of where the gas stream is passed through a scavenging apparatus containing triazine.

19. The method of claim 18 wherein the H2S scavenger reaction product is a reaction product from the triazine reacted with H2S.

20. The method of claim 15 wherein the acidic solution includes an acid with a vapor pressure less than hydrochloric acid.

21. The method of claim 15 wherein the acidic solution is a phosphoric acid solution buffered to pH 2-4.

22. The method of claim 15 wherein obtaining a sample occurs while the step of passing continues.

* * * * *